United States Patent [19]

Abel et al.

[11] 4,205,905

[45] Jun. 3, 1980

[54] HOLDER FOR NOSEPADS ON METAL SPECTACLES

[75] Inventors: Winfried Abel; Wilhelm Laib, both of Böblingen, Fed. Rep. of Germany

[73] Assignee: Otto Laib GmbH & Co., Böblingen, Fed. Rep. of Germany

[21] Appl. No.: 804,076

[22] Filed: Jun. 6, 1977

[30] Foreign Application Priority Data

Oct. 29, 1976 [DE] Fed. Rep. of Germany ....... 7634193

[51] Int. Cl.² .......................... G02C 5/12; G02C 5/02; G02C 1/00
[52] U.S. Cl. .................................. 351/138; 351/132; 351/80; 351/88
[58] Field of Search ................. 351/136, 137, 138, 80, 351/88, 132

[56] References Cited

U.S. PATENT DOCUMENTS

| 2,026,275 | 12/1935 | Eagle ................................... 351/137 |
| 2,080,853 | 5/1937 | Nelson ................................. 351/138 |
| 4,040,729 | 8/1977 | Winkler et al. ...................... 351/137 |

*Primary Examiner*—John K. Corbin
*Assistant Examiner*—Rodney B. Bovernick
*Attorney, Agent, or Firm*—Schwartz, Jeffery, Schwaab, Mack, Blumenthal & Koch

[57] ABSTRACT

Spring metal supports are soldered to the edges of metal spectacle frames and are formed to define a pair of spring tines having hooked ends. The tines extend through openings in studs embedded in plastic nose pads with the hooked ends of tines normally preventing withdrawal. The tines extend loosely through the openings so the nose pads are free to tilt a limited amount in any direction.

9 Claims, 7 Drawing Figures

HOLDER FOR NOSEPADS ON METAL SPECTACLES

BACKGROUND OF THE INVENTION

In the case of spectacle frames which consist of plastic, having a relatively great material thickness, a connecting web, having a corresponding width, extends between the two lens frames and serves as support for the spectacles on the bridge of the nose. In contrast, in the case of spectacle frames of a finer material, especially in the case of metal frames, so-called nose pads are used, i.e. small, elongated, easily bent platelets of plastic or the like, which lie against the bridge of the nose from the side and which are fastened to the frame of the spectacles with the aid of a holder of German silver, bronze, or a similar material.

Although the approximate adaptation of the spectacles, respectively their support on the shape of the nose, is carried out by the optician, a certain resilience of the nose pads, if possible in several directions, is desired to assure comfortable wearing properties. This articulation, which is multi-directional if possible, has led to considerable expense in production and assembly in the existing configurations.

Thus, a construction is known, consisting of a connecting component, which projects from the nose pad, and of a hinge shell, which runs approximately horizontally and parallel to the nose pad. A bearing cap, which is soldered to one end of the web support which comes from the spectacle frame, is inverted over this hinge shell. A very small screw goes through the bearing cap and the hinge shell. In addition to the time-consuming and expensive assembly, this construction has the disadvantage that, for each metal spectacle, a left and a right web support is necessary, which is soldered with a bearing cap, because the screw connection can be carried out only from one side.

In accordance with another known proposal, the connecting component which projects from the nose pad is configured as a plug with a constricted cross-section, while a slit, openable frame is fastened to a reversely bent end of the web support, the frame having a rectangular opening corresponding to the plug, whereby the frame is inserted in the constriction of the plug and, for this purpose, the initially opened frame is again bent closed after the insertion over the plug.

Although this construction has led to advantageous results and also resulted in labor savings, experience shows that deformations occur as a result of the bending of the leg of the frame, which is necessary for the assembly, because the force which is exerted with the assembly tool cannot be accurately controlled or sensed, so that the coupling is either too loose, or, which happens more frequently, too tight and the desired articulation is lost.

SUMMARY OF THE INVENTION

It is, therefore, the objective of this invention to provide a holder for nosepads, which can be constructed extremely easily, requires practically no tools, and particularly no hand finishing, so that sources of failure and waste during assembly are substantially eliminated.

Starting with a holder for nosepads on metal spectacles, each consisting of a web support, of which one end is soldered to the spectacle frame and of which the other bent-back end is connected with a hinge and connecting component, which is cast into the nosepad, while maintaining an articulation, which is preferably limited on all sides, it is proposed, in accordance with this invention, for the solution of the above-mentioned problem, that the connecting component projecting from the back of the nosepad consists of a plug, which contains an opening which runs essentially parallel to the nose pad, and that the other bent-back end of the web support is forked and provides arresting components at the ends of spring fork tines, which can be assembled with the counter arresting components, which are arranged in the opening of the connecting components.

In this manner, the assembly of the individual components is simplified considerably and remains practically independent of all requirements with respect to operating skill. In the assembly of the spectacle frame, the nosepads only need to be applied and mounted on the web supports which are already soldered to the temple frame, whereby the plug connection is completed when the cooperating arresting component and counter arresting component engage each other on the tines of the fork and in the insertion opening.

In a preferred embodiment of the invention, the arresting components arranged on the spring fork tines, can consist of enlargements, which are directed outwardly from the fork tines and oppose each other. On the other hand, a stop limiting the depth of insertion, as well as projections limiting the withdrawal motion at the end of the opening, can be provided in the opening of the hinge and connection component, where the enlargements of the fork tines make contact.

As soon as the spring fork tines, with their enlarged ends, have been pushed through the length of the opening which is in the connecting component and have been moved slightly towards each other for this purpose during the insertion process, the fork tines spring back into their initial positions, so that the enlargements lie opposite stop surfaces which are provided at the end of the opening and prevent a withdrawal motion.

In accordance with another special characteristic of the invention, the opening in the hinge and connecting component can be divided into two channels by a stop which limits the depth of insertion, whereby each of the channels accepts one of the tines of the fork. These channels are of a cross-section, which is preferably somewhat greater, in all directions, with respect to the cross-section of the tines of the fork, in order to assure the universal articulation of the nosepad which is hinged on the hinge component of the web supports.

Additional details and advantages of the invention can be derived from the following description of an embodiment which is illustrated in the drawings.

DESCRIPTION OF A PREFERRED EMBODIMENT

Figure 6:
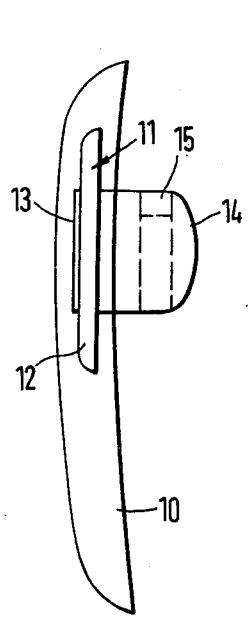
FIG. 6 is a side view of a hinge and connecting component provided with a nosepad.
Figure 7:
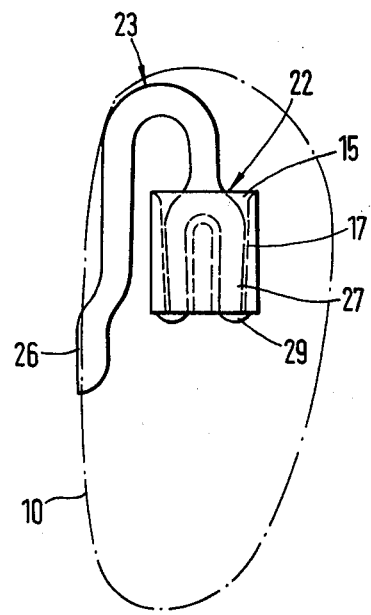
FIG. 7 is a view of the unit, consisting of nosepad, hinge component, and web support.
Figure 2:
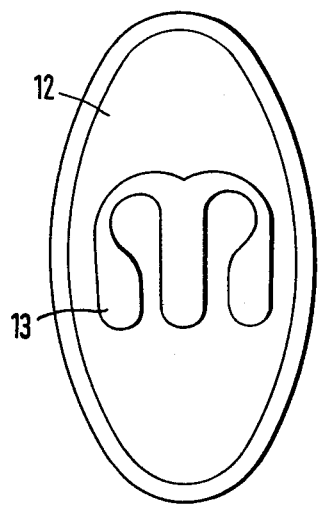
FIG. 2 is a view of the hinge and connecting component which is to be cast with the nosepad.

Nosepad 10, consisting, for example of transparent plastic is illustrated in FIGS. 6 and 7 in its outline, however, the illustrated shapes and curvatures are not an essential part of this invention. A hinge and connecting component 11 is cast into nosepad 10 in accordance with FIGS. 2 and 5, being anchored in the plastic, for example, with oval plate 12. To secure plate 12, projections in the form of a decoration or a trademark 13 are provided on the top side, preferably in the form of an engraving in the jet mold, when the hinge and connecting component 11 is configured as an injection molded component.

Figure 4:
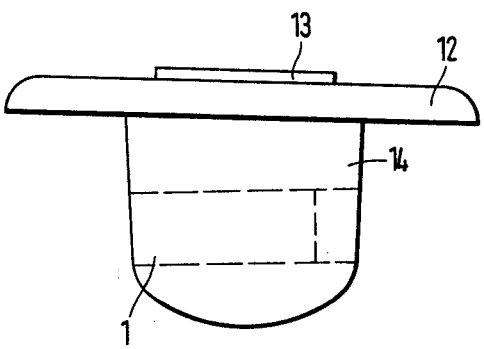
FIG. 4 is a side view of the nosepad corresponding to direction IV—IV in FIG. 3.
Figure 3:
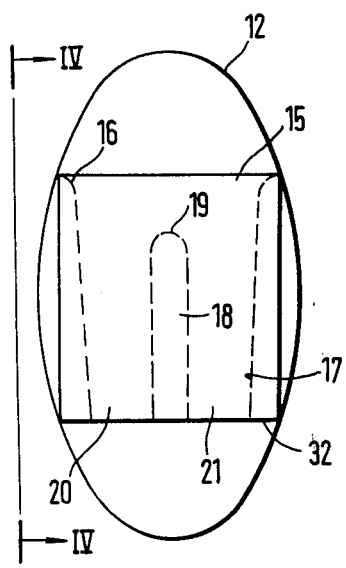
FIG. 3 is a view of the nosepad in accordance with FIG. 2 from the rear.

The hinge and connecting component 11 has a plug 14, projecting from the anchoring plate 12, which has, in accordance with FIGS. 3 and 4, an essentially rectangular cross-section and an opening 15 (FIG. 3). Opening 15 has an insertion opening which is inclined or rounded as at 16, and side walls 17 which converge towards the bottom. Opening 15 is provided with a separation web or partition as shown in FIG. 3, of which the upper end 19 forms a stop surface.

Figure 5:
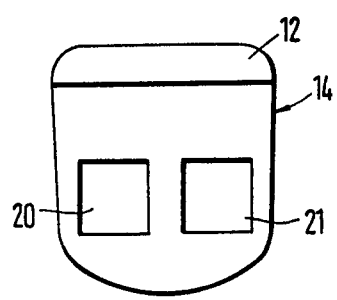
FIG. 5 is a plan view on the nosepad in accordance with FIG. 3.

Web 18 divides opening 15 into two channels, 20, 21 which are shown in FIG. 5, where the hinge and connecting component is illustrated from the bottom. The cross-section of channels 20, 21, which are formed by web 18, are square in the illustrated embodiment, although this shape is not critical.

Figure 1:
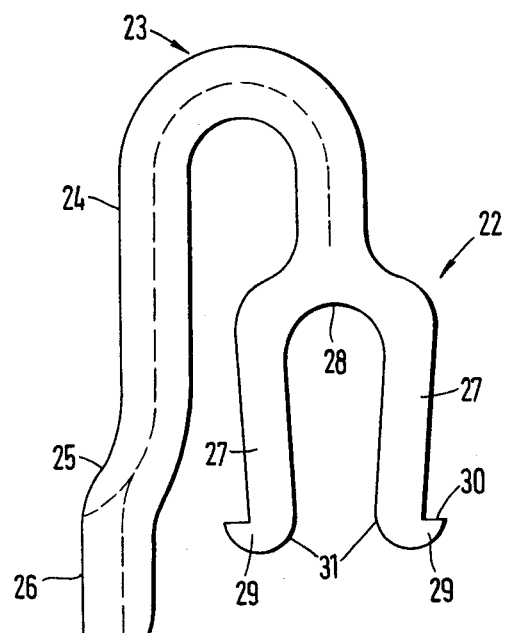
FIG. 1 is a view of the one-piece stamped and molded component consisting of web supports and fork end.

Nosepad 10 is articulatingly held on a fork section 22, by means of the cast-in plug 14, in accordance with FIGS. 6 and 7, arranged on a web support 23, whereby web support 23 and fork section 24 can be configured as a one-part stamped component in accordance with FIG. 1. The material thickness is so dimensioned that the legs of fork 22 and support 23 are approximately square in cross-section. The elongated web section itself can be reformed in a die with round cross-section, whereby spring bronze preferably serves as the material for the web support. At its end, web support 23 is provided with an upset section 25 with a flat connecting surface 26, which is used for connection, such as soldering, to the metallic spectacle frame.

Fork section 22 consists of two fork tines or legs 27, which are connected to each other through an inner middle crown 28, which connects to the web support 23. In accordance with FIG. 1, the fork tines may be formed slightly converging towards each other, by bending or stamping, although this shape is not absolutely essential for the invention. The outer ends of fork tines 27 are provided with extensions, which extend away from each other and form stop surfaces 30. In the areas 31, which face each other, extensions 28 are rounded.

In accordance with FIGS. 1, 3 and 7, it can be seen that, for the assembly of a nosepad 10 on a web support which is soldered to the spectacle frame, fork section 22 is inserted in opening 15. The upper rounded insertion edges 16 and the lower, also rounded, extensions of the fork ends facilitate the insertion process. The individual channels 20, 21, which are formed by web 18, are large enough in cross-section to permit the unhindered passage of the fork tines with extensions 29. Because side walls 17 of opening 15 converge towards the bottom in accordance with FIG. 3, fork ends 27 of the web support are sprung inwardly towards each other during the insertion, so that the fork tines spring outwardly as soon as the extension 28 are free of channels 20, 21. As soon as the fork ends spring apart to the condition illustrated in FIG. 7, the assembly is completed and the mutual locking of the assembled components is assured. It can also be seen from FIG. 7 that a certain amount of play or excess dimension is provided all around, between the fork tines 27, side walls 17 of opening 15 and middle web 18, assuring the articulation of the nosepad which is applied to the web support 23. A similar and possible greater freedom of articulation of the fork tines within channels 20, 21 is also provided in the direction perpendicular to the plane of the drawing in accordance with FIG. 7. It can be recognized that the described and illustrated insertion and stop connection simplifies and facilitates the assembly process between nosepad and web support in comparison with all other known proposals. The time period for the assembly is thus reduced to a fraction of the time previously required.

We claim:

1. A holder for nosepads on metallic spectacles, comprising a web support, one end of which is adapted to be soldered to a spectacle frame and the other end of which is loosely connected to a hinge and connecting component, which is cast into a nosepad, while permitting limited universal movement, said hinge and connecting component projecting from the nosepad and having an opening, extending substantially parallel to the plane of the nosepad, said web support having a fork portion including two resilient tines with stop components at their free ends pointing away from each other and adapted to be inserted by snap action into said opening for mounting each of said nosepads, the improvement comprising:

the tines of said fork portions being spaced apart by oppositely curved crown portions of substantial length connecting said tines to each other and to the web support;

said tines converging with respect to each other in the direction towards their free ends;

said opening of the hinge and connecting component having side walls converging toward each other from an enlarged inlet portion toward the exit portion of said opening, and having a central web providing an inner stop for engagement with the apex common to the crown portions between said tines.

2. Holder as defined in claim 1, wherein the edges of the inlet portion of said opening are beveled or rounded.

3. Holder as defined in claim 1, wherein the leading surfaces of each spring tine and of its stop component are rounded.

4. Holder as claimed in claim 1, wherein the central web extends toward the exit end of said opening for dividing said opening into two similar guiding channels.

5. Holder as defined in claim 1, wherein the side walls of the openings converge toward the exit end of said opening define shoulders which serve as a stop means for the fork tines which are provided with the enlargements.

6. Holder as defined in claim 1, wherein the distance between the stop component which limits the insertion depth and the stop components in the plug portion which prevent the withdrawal movement is less than the vertical distance between the inner side of the web support and stopping edges of the enlargements at the ends of the fork tines.

7. Holder as defined in claim 1, wherein said component which limits the insertion depth, divides the opening into two channels and into each of which one fork tine can be inserted.

8. Holder as defined in claim 7, wherein the cross-section of the channels within the component is larger in size in all directions than is the cross-section of the fork tines to provide freedom of articulation in all directions.

9. Holder as defined in claim 8, wherein the support including ends of the fork legs is made of a uniform punched part of a flat material whereby the thickness of the flat material is several tenths of a millimeter less than the size of the cross-sections of the respective channels in the component.

* * * * *